United States Patent [19]

Williams

[11] Patent Number: 5,452,161
[45] Date of Patent: Sep. 19, 1995

[54] FLEXIBLE VANE LATCH APPARATUS FOR A DISK DRIVE

[75] Inventor: Stephen P. Williams, Morgan Hill, Calif.

[73] Assignee: Quantum Corp., Milpitas, Calif.

[21] Appl. No.: 184,825

[22] Filed: Jan. 21, 1994

[51] Int. Cl.⁶ .................. G11B 21/22; G11B 21/02
[52] U.S. Cl. .................................. 360/105; 360/86
[58] Field of Search .............. 360/105, 103, 86, 106, 360/97.01, 98.01, 99.01, 137; 369/244, 257, 235, 215, 222

[56] References Cited

U.S. PATENT DOCUMENTS

| | | | |
|---|---|---|---|
| 4,538,193 | 8/1985 | Dimmick et al. | 360/137 |
| 4,562,500 | 12/1985 | Bygdnes | 360/86 |
| 4,647,997 | 3/1987 | Westwood | 360/105 |
| 4,670,804 | 6/1987 | Kant et al. | 360/102 |
| 4,692,829 | 9/1987 | Campbell | 360/105 |
| 4,903,157 | 2/1990 | Malek | 360/105 |
| 4,996,617 | 2/1991 | Yaeger et al. | 360/105 |
| 5,003,422 | 3/1991 | Sun et al. | 360/105 |
| 5,025,335 | 6/1991 | Stefansky | 360/97.01 |
| 5,036,416 | 7/1991 | Mastache | 360/105 |
| 5,043,834 | 8/1991 | Kubo et al. | 360/105 |
| 5,117,318 | 5/1992 | Immler et al. | 360/105 |
| 5,124,867 | 6/1992 | Kitahori et al. | 360/105 |
| 5,208,713 | 5/1993 | Lindsay et al. | 360/105 |

Primary Examiner—Robert S. Tupper
Assistant Examiner—Craig A. Renner
Attorney, Agent, or Firm—David B. Harrison

[57] ABSTRACT

An actuator assembly latching apparatus for a disk drive is realized with an elongated flexible vane disposed in proximity to a rotating disk. The rotating disk produces an airflow at different speeds across the flexible vane. Resulting differential ambient air pressures produce a net force which deflects the vane toward the disk surface thereby to unlatch a head arm actuator assembly within the disk drive. Once disk rotation ceases, the vane returns to its original, undeflected position and latches the head arm actuator assembly to maintain heads at a radially innermost parking location on the disk surfaces.

12 Claims, 2 Drawing Sheets

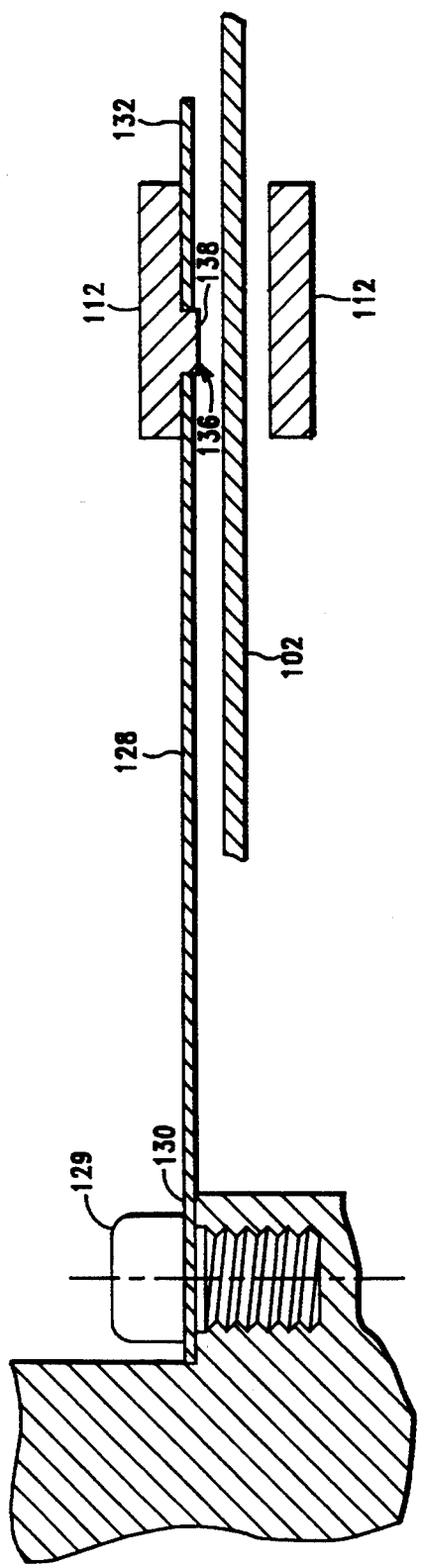
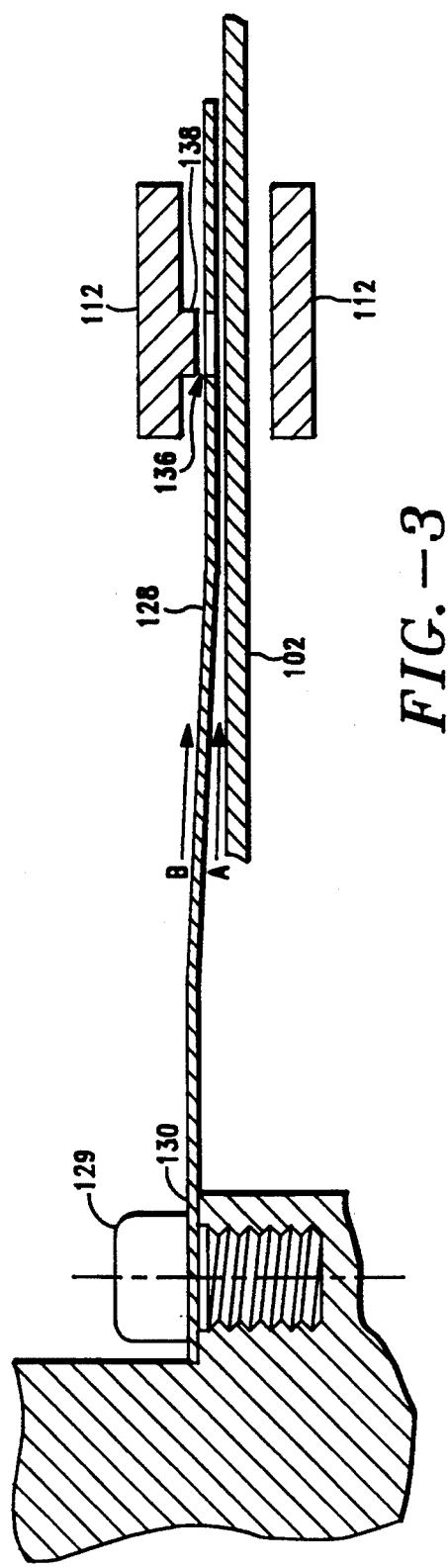

FLEXIBLE VANE LATCH APPARATUS FOR A DISK DRIVE

FIELD OF THE INVENTION

The present invention relates to a latching apparatus, within a disk drive, for releasably latching a read/write transducer actuator assembly at fixed locations relative to a disk. More particularly, the present invention relates to a latching apparatus for releasably latching a read/write transducer actuator assembly using a flexible vane which is deflected to a release position by differential ambient pressures resulting from disk airflow.

BACKGROUND OF THE INVENTION

In conventional Winchester disk drives, a read/write head or transducer assembly "flies" upon an air cushion or bearing in close proximity, e.g., within seven microinches, to a surface of a rotating disk. The disk surface carries a thin film magnetic material having a multiplicity of magnetic storage domains that may be recorded and read back by the head. The read/write transducer assembly, e.g., a well-known combination of transducers, sliders and load beams, is positioned and supported proximate the disk surface using an actuator assembly. The actuator assembly supports the load beams and sliders, and accurately positions the transducers above the disk surface such that data may be read and written from/to the disk. The load beam typically applies a preload force to the slider to urge it toward the disk surface. This force is overcome by the air bearing ensuing during disk rotation.

Actuator assemblies typically contain a driving mechanism to facilitate transducer positioning and a carriage assembly for connecting the driving mechanism to the transducer assembly. Typically, the driving mechanism is either a linear or rotary actuator motor that moves the carriage assembly along a predefined path to accurately position the transducers relative to the disk surface. In high capacity hard disk drives, the actuator motor includes a voice coil operating within a closed loop head position servo.

When disk rotation ceases, the air bearing no longer overcomes the preload force or supports the transducers above the disk surface. In most hard disk drives, when power is removed from the spindle motor that rotates the disk, the transducers come to rest upon the disk surface. To ensure that the transducers do not come to rest upon a portion of the disk that contains recorded data, as the disk drive is powered down, the actuator assembly positions the transducers over a so-called landing or parking zone on the disk surface. Typically, after power has been disconnected from the disk drive, back-EMF energy from the spindle motor is used, in a well-known manner, to power the actuator assembly and position the transducers in the landing zone. Thus, after the disk ceases to rotate, the transducers have been appropriately positioned for parking and come to rest upon the disk surface in the landing zone.

Conventionally, while the disk drive is not operating, friction between the transducers and the disk surface helps to maintain the actuator assembly in a fixed position. However, lateral mechanical shock to the disk drive can cause the transducers to move (slide) radially across the surface of the disk. Such movement, in absence of an air bearing, may result in damage, e.g., abrasions, scratches and dents, to the surface of the disk as well as damage to the sliders and transducers themselves. Such damage can result in a loss of data and/or transducer malfunction that can render the disk drive inoperable.

Consequently, those skilled in the art have employed a wide variety of actuator latching devices to maintain an actuator assembly in a locked position while the disk is not rotating. When the disk has attained a proper rotational velocity to produce a sufficient air bearing to support the transducers, the devices release the actuator assembly and permit it to operate through its limited range of travel relative to the disks.

Generally, there are three well-known approaches: solenoid safety latches, magnetic capture latches, and rigid air vane latches. Each of these latches is discussed below.

Solenoid safety latches typically have a pin, rod or shaft biased into engagement with a movable portion of an actuator assembly by a spring or by magnetic field attraction. The pin, so engaged, immobilizes the actuator assembly. A solenoid, attached to the pin, withdraws the pin from the actuator assembly when the disk attains an appropriate rotational velocity to produce an air bearing. This approach requires a complex electromechanical latching apparatus that adds to the size, weight, cost, and power consumption of a disk drive. Examples of solenoid safety latches include U.S. Pat. Nos. 4,881,139; 4,903,157; and, 5,095,395.

Magnetic capture latches typically have a small permanent magnet attached to a movable portion of an actuator assembly and a steel striking plate mounted at a fixed location on the disk drive housing. The permanent magnet and striking plate are positioned such that, when the transducers are positioned in the landing zone, the permanent magnet attaches to the striking plate. The attractive force (latching force) between the permanent magnet and the striking plate immobilizes the actuator assembly. Once the disk has been brought to an appropriate rotational velocity to produce an air bearing, the actuator assembly motor overcomes the latching force and moves the actuator assembly such that the permanent magnet separates from the striking plate. An example of a magnetic capture latch is given in U.S. Pat. No. 5,025,335.

Though typically small in size themselves, such magnetic capture latches require larger actuator motors than disk drives without magnetic catch latches because the actuator assembly motors must be capable of overcoming the latching force as well as positioning the transducers. Further, such disk drives are susceptible to damage from mechanical shocks that have a force greater than the latching force. Such shocks may dislodge the permanent magnet from the striking plate and cause the transducers to move across the surface of the disk in absence of a air bearing; thus, causing damage to the disk drive. Also, the magnetic field may add a deflection bias force to the actuator at the vicinity of innermost data tracks, thereby potentially interfering with, or adding complexity to, the head positioner servo loop. One way of minimizing this bias force is to provide a shifting proximity magnetic capture latch, such as disclosed in U.S. Pat. No. 5,003,422; and, in commonly assigned, copending U.S. patent application Ser. No. 07/964,762 filed on Oct. 22, 1992 now U.S. Pat. No. 5,341,259. Also note commonly assigned U.S. Pat. No. 5,208,713 for its disclosure of a bistable magnetic, electromagnetic actuator latch structure.

Air vane latches typically contain a rigid air vane latch mechanism that engages, through a spring generated bias force, a movable portion of an actuator assembly whenever a disk is not rotating. The air vane latch also contains a rigid, non deformed air vane, extending from or attached to the mechanical latch mechanism. The air vane utilizes the windage from a rotating disk to unlatch the latch mechanism. Specifically, windage from the rotating disk pushes the air vane creating enough force to overcome the bias force and disengage the latch mechanism from the actuator assembly. Examples of air vane latches are described in commonly assigned U.S. Pat. Nos. 4,538,193; 4,647,997; and 4,692,829; and, commonly assigned, copending U.S. patent application Ser. No. 08/005,645, filed on Jan. 19, 1993, now U.S. Pat. No. 5,319,511; and U.S. Pat. Nos. 5,036,416; and, 5,124,867.

However, to produce a sufficient force to overcome the bias force, such air vane latches require an appropriate air vane surface size and sufficient airflow within the disk enclosure. Such surface size can require excessive spacing between the disk and the drive enclosure. Also, in a multiple-disk drive, the air vane is located between one or more of the disks and, as such, the disks are spaced sufficiently apart to accommodate the air vane structure. Such increased spacing can necessitate increased size, weight and cost of the disk drive.

Therefore, a need exists in the art for a simple, cost efficient latching apparatus that does not require any modification to the size of a disk drive into which it is incorporated.

SUMMARY OF THE INVENTION

A general object of the present invention is to provide a latch apparatus for a disk drive actuator assembly which overcomes limitations and disadvantages of prior approaches.

A more specific object of the present invention is to provide a flexible vane which responds to a deflecting force to achieve a latch apparatus for a disk drive actuator assembly.

A further specific object of the present invention is to provide a latch apparatus having a single moving component readily formed of inexpensive material and, as such, produce a low cost latch apparatus.

In accordance with principles of the invention, a disk drive actuator latch apparatus is realized with an elongated flexible vane disposed in proximity to a rotating disk. Differential ambient air pressures result in a net force which deflects the vane toward the disk surface thereby to unlatch a head arm actuator assembly within the disk drive. The disk drive, within which the invention is used, includes a housing to which is attached all of the component parts of the disk drive. Within the disk drive, a spindle motor is fixedly attached to the housing and forms a spindle hub of at least one disk. A voice coil actuator structure, either rotary-type or linear-type, is secured to the housing adjacent the disk. A movable portion of the actuator assembly carries a transducer assembly that extends over the disk surface. The latch apparatus preferably comprises a pin or boss extending from the movable portion of the actuator assembly, an elongated flexible vane having a first end attached to the housing and having an aperture at a second end for engaging the pin or boss on the actuator assembly. The air vane is sized, shaped and positioned relative to the rotating disk surface such that during disk rotation, the vane is drawn toward the disk in accordance with the Bernoulli effect or principle, and thereupon disengages the pin or boss, thereby releasing the actuator from its latched position. When the disk ceases to rotate, the air vane returns to its original position as the actuator returns to its parking or landing zone position. When these positions coincide, the aperture of the vane slips over the pin or boss, and the actuator structure becomes latched at the head parking position.

In this embodiment of the invention, the end of the vane containing the aperture is positioned between the movable portion of the actuator assembly and the surface of the disk. Furthermore, in this location, a long axis of the vane is substantially orthogonal to a radial of the disk. As such, when the disk rotates, windage from the disk, establishes a differential ambient pressure on each side of the flexible vane, and a resulting net force applied thereto causes the flexible vane to be displaced by the Bernoulli effect toward the surface of the disk such that the aperture disengages the pin or boss. Consequently, as long as the disk is rotating, the latch is disengaged and the actuator assembly may freely position the transducer assembly over the disk. Upon cessation of disk rotation, the Bernoulli effect ceases, and the flexible vane member is no longer deflected toward the disk surface. Consequently, the aperture engages the pin on the actuator assembly and immobilizes the actuator assembly.

In a related aspect of the present invention, a method is provided for latching a head positioner actuator structure of a disk drive in order to maintain a data transducer head at a head parking position when a data storage disk of the drive is not rotating. The method comprises the steps of:

positioning a thin, flat, flexible air vane member having shape memory in proximity to a surface of the data storage disk, the flexible member including a portion having an inner surface facing a surface of the disk, and having an outer surface facing away from the disk, the air vane member including one part of a two-part latch structure, the actuator structure including a second part of the two-part latch structure, the one part engaging the second part in the absence of deflection of the air vane member, rotating the data storage disk during data transfer operations of the disk drive so as to generate an airflow at the vicinity of the flexible air vane member, causing air to flow at a higher velocity across the inner surface than the outer surface of the portion, thereby creating differential ambient pressures and a net force deflecting the air vane member toward the disk by the net force in accordance with the Bernoulli effect, and releasing the one part of the actuator structure from engagement with the second part upon deflection of the air vane member.

In this aspect of the invention, the step of positioning the air vane member in proximity to a surface of the data storage disk preferably comprises the step of positioning the air vane member at a radially outermost region of the surface of the data storage disk.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 depicts a cross-sectional view of the embodiment of the invention along line 2—2 in FIG. 1 with the actuator latch shown in the latched position.

FIG. 3 depicts a cross-sectional view of the embodiment of the invention along line 2—2 in FIG. 1 with the actuator latch shown in the unlatched position.

DETAILED DESCRIPTION OF A PREFERRED EMBODIMENT

Figure 1:
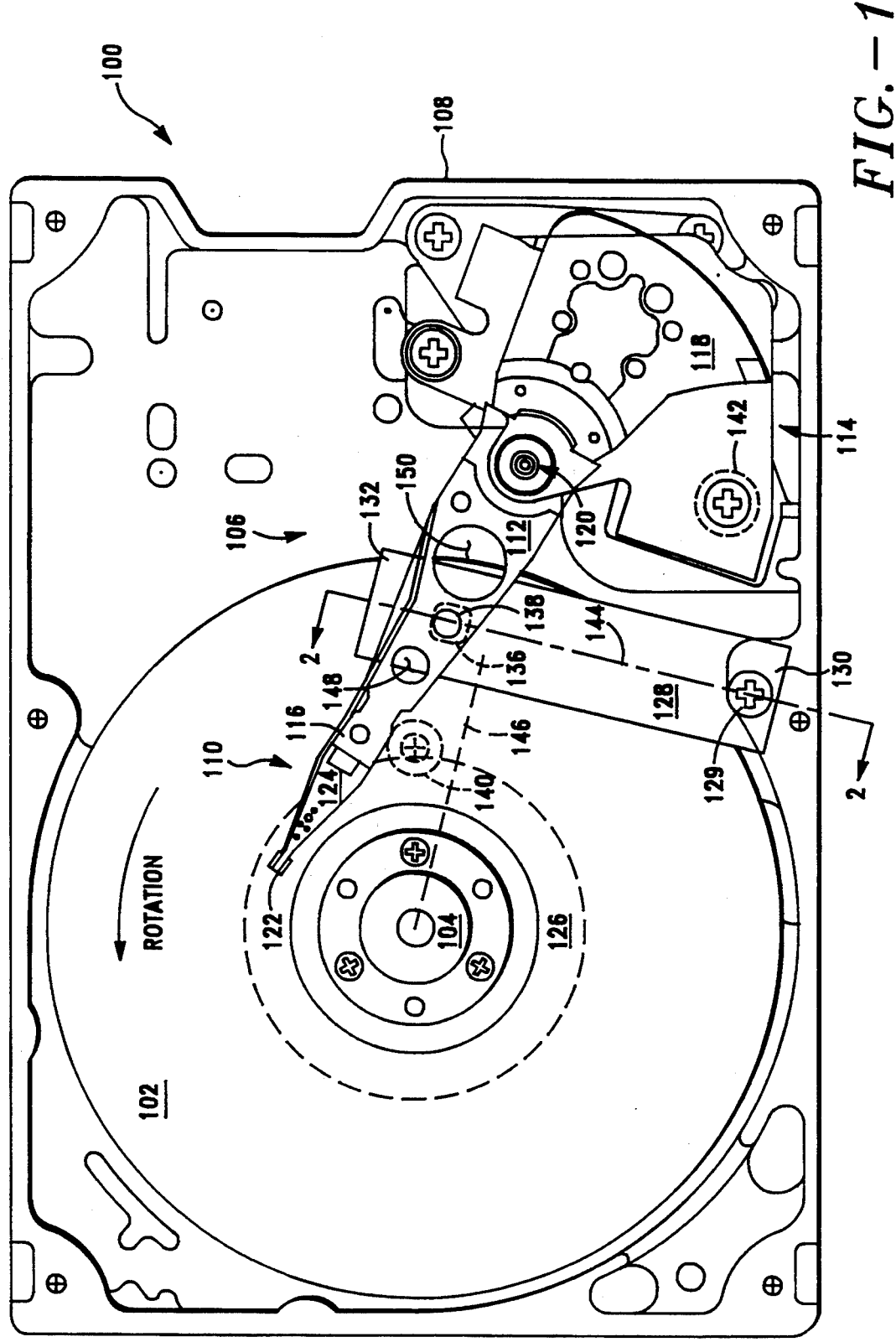
FIG. 1 depicts a top plan view of a disk drive in accordance with a presently preferred embodiment of the invention.

FIG. 1 depicts a top plan view of a disk drive 100 including a flexible air vane actuator latch embodying principles and aspects of the present invention. The disk drive 100 contains a rotatable storage disk 102, a spindle motor (not specifically shown) and a hub 104, an actuator assembly 106 and a base housing 108 to which the various components of the disk drive are mounted. For simplicity, the following discussion mentions only a single storage disk in the disk drive, and only one rotating disk surface is required to realize the present invention. However, as those skilled in the art will recognize from the following discussion, the present invention is capable of use in disk drives having multiple, commonly journalled data storage disks.

Typically, the storage disk is coated with a magnetic material that stores data. However, as those skilled in the art will also realize, besides a magnetic storage medium, the storage medium could also be optical, magneto-optical, and the like.

To achieve disk rotation, the spindle motor is mechanically coupled through the spindle hub 104 to an inner diameter of the disk. In modern hard disk drives, the spindle motor is integrated into the hub that supports the storage disk and, as such, the spindle motor supports and directly rotates the storage disk.

The actuator assembly 106 further contains a transducer assembly 110, a carriage assembly 112, and an actuator voice coil motor 114. The depicted actuator assembly 106 is a rotary-type assembly. From the following discussion, those skilled in the art will realize that the invention is also capable of latching a linear-type voice coil actuator assembly.

In the rotary actuator assembly 106, the transducer assembly 110 is attached to a first end 116 of the carriage 112 e.g. by ball swaging, while the voice coil of the actuator motor 114 is attached to a second end 118 of the carriage by adhesive or by integral molding thereto. Centrally located along the carriage is a journal 120 about which the actuator assembly rotates. The journal 120 is located adjacent to the storage disk 102 such that the carriage 112 extends the transducer assembly 110 over the surface of the storage disk 102. Consequently, selective activation of the actuator motor 114, typically a voice coil motor (VCM), rotates the actuator assembly 106 about the pivot 120 and accurately positions the transducer assembly 110 over the surface of the storage disk 102. As such, data can be conventionally written to and read from the storage disk 102 by read/write transducers 122 of the transducer assembly 110.

Typically, the transducer assembly 110 contains, on each side of the storage disk, a transducer 122 formed on an air bearing slider, and a load beam 124. The load beam 124 connects at one end to the carriage while the other end supports the slider and its transducer over the disk surface. The load beam 124 preloads or biases the slider toward the surface of the disk such that when the storage disk 102 is not rotating, the slider 122 rests upon the disk surface. On the other hand, when the storage disk 102 is rotating, the slider-transducer 122 overcomes the load beam preload force and "flies" just above the disk surface on an "air bearing" in accordance with conventional Winchester disk principles. During flight, the actuator assembly 106 positions in unison the load beams 124 and their associated slider-transducers 122 over the surfaces of the storage disks 102 in order to read and write data from and to each selected disk surface. However, when the disk drive is deactivated, the transducers 122 must be "parked" at a position or "landing zone" where they will not damage the surfaces of the disks while resting thereupon. Typically, the landing zone 126 is an annular portion of the storage disk surface that is nearest the hub. This inner annular region defines the least amount of available disk area, and its dedication as a parking or landing zone results in the lowest amount of otherwise usable data storage space being lost. The flexible air vane actuator of the present invention latches the actuator assembly 106 as the transducers come to rest in the landing zone 126.

The present invention immobilizes (latches) the actuator assembly while the transducers are parked, thus protecting the disk surface from potential damage caused by the transducers inadvertently sliding over the surface of the disk.

The presently preferred latching apparatus includes a relatively thin, flexible vane 128. By "vane" is meant a thin and flat piece of non-woven web or sheet material having structural integrity as well as flexibility along a principal longitudinal or lengthwise axis thereof. The vane 128 includes first and second ends 130, 132 and defines or includes a structural region or portion which is sized and positioned to cause the vane 128 to become deflected from a latched position to an unlatched position. The flexible vane 128 also manifests "memory" in the sense that when the deflecting force is removed, it returns to its original undeflected position or configuration.

Illustratively, the flexible vane 128 may be formed of any suitable material, such as thin polyester film (Mylar), steel, or other flexible sheet material manifesting requisite flexibility and memory. The first end 130 of the vane 128 is fixedly attached, via e.g. a screw 129 or other suitable fastening agent, to the disk drive housing 108. The second end 132 of the vane defines an opening or aperture 136. A pin or boss region 138 is formed on the actuator assembly 106. To realize actuator assembly immobilization, the aperture 136 is engaged by the pin 138 located on the carriage assembly 112 when the heads are at the inner landing zone 126 and when the disk 102 is not rotating sufficiently to attract the vane 128.

Typically, when the transducers 122 are appropriately positioned for latching at the landing zone 126, the carriage assembly 112 is positioned adjacent to or against an inner elastomeric crash stop 140. Generally, the inner crash stop 140 ensures that the transducers 122 will not contact the hub structure (disk spacer or disk clamp). An outer crash stop 142 ensures that the transducers cannot travel outwardly beyond the outer periphery of the storage disk 102 in accordance with conventional contact start-stop (CSS) hard disk recording techniques. When latched, the carriage assembly is maintained in a fixed position by the inner crash stop and by the flexible vane 128 so long as it engages the pin or boss 138.

To further understand the operation of the invention, the reader should simultaneously consider FIGS. 1, 2 and 3. In these views the vane 128 is positioned to extend over one surface of the storage disk 102 such that a long axis 144 of the vane 128 is substantially orthogonal to a radial 146 of the disk. The vane 128 typically (although not necessarily) has a rectangular plan form; and being so shaped and located the vane 128 is deflected by differential ambient air pressures associated with the Bernoulli principle toward the surface of the rotating disk. The Bernoulli effect or principle is advantageously employed to provide the deflection force needed for operation of the actuator latch. The Bernoulli principle or effect is that an increase in the speed of a fluid such as air produces a decrease in pressure; and, a decrease in the speed produces an increase in the pressure (but not exceeding the ambient pressure).

Specifically, the close proximity (typically, 0.6 mm) of an active surface portion of the flexible vane 128 to the disk surface produces a high velocity air flow (arrow A) through a relatively small space between the vane and the disk. The air flowing over the vane (arrow B) has a lower velocity than that flowing Beneath the vane (arrow A). As such, the air pressure above the vane is higher than that beneath the vane. Consequently, while the storage disk 102 is rotating, the vane 128 is deflected toward the disk surface and the aperture 136 disengages the pin 138. Additionally, an air bearing is formed between the vane and the disk surface such that the vane, though deflected toward the surface by the Bernoulli effect, will not impact or otherwise come into contact with the disk surface. Thus, as long as the disk 102 is rotating, the actuator latch formed by the vane 128 and pin 138 is disengaged, and the carriage assembly 112 is free to position the transducers 122 over the disk surfaces throughout its limited range of rotational displacement.

However, when power is removed from the disk drive 100, back-EMF energy from the rotating spindle motor is conventionally applied to the voice coil motor 114 which results in a torque to return the transducers 122 to the landing zone 126. Once rotation of the storage disk(s) 102 reaches some low angular velocity, air flow ceases to bias the vane 128 toward the disk 102 and, because of the memory of the air vane material, the air vane 128 returns to its undeflected position (FIG. 2) whereupon the aperture 136 becomes engaged by the pin 138 to latch and thereby immobilize the carriage assembly 112.

When the disk drive 100 is reactivated and power is applied to the spindle motor, the storage disk 102 begins to rotate. As rotation builds, the rotating disk 102 produces an air bearing upon which the transducers 122 fly and, in addition, in combination with the flexible air vane 128 produces a Bernoulli effect to disengage the latch, i.e., disengage the aperture 136 from the pin 138. In this manner, the carriage assembly 112 becomes operational, i.e., becomes automatically unlatched, whenever the disk 102 is rotating at a sufficient velocity to produce an air bearing to support the transducers.

Illustratively, to produce a sufficient Bernoulli effect from a 3.5 inch diameter storage disk rotating at 3600 RPM, the vane is formed as a rectangle of e.g. Mylar, having approximate dimensions of 53.3 mm (length) by 14 mm (width) by 0.08 mm (thickness). Furthermore, the vane 128 is aligned over the disk 102 at a location realizing highest relative air speed, i.e., as near to the outer edge of the disk as possible. Additionally, to facilitate the Bernoulli effect, holes 148 and 150 may be defined through the carriage 112 adjacent to the pin 138. Such holes ensure that approximately one atmosphere of pressure is maintained upon the side of the vane facing the carriage.

Furthermore, use of a thin sheet of material (0.08 mm) to form the flexible vane 128, practically necessitates that the vane is positioned to be in tension in the latched state. If a thin flexible vane is placed in compression, the vane may crumple and be permanently deformed. Thus, positioning the vane as shown in FIG. 1 is recommended. Specifically, while the carriage assembly 112 is latched, the vane 128 is in tension and the carriage assembly rests against the inner crash stop to ensure that a compressive force will not be applied to the vane 128. Nonetheless, if a thicker vane were used, such a vane could be made to be capable of operating as a beam under compression as well as tension. However, such a thicker beam is inherently less flexible than a thin vane and the actuator design would necessitate increasing the magnitude of the Bernoulli effect by either increasing the rotational velocity of the disk or increasing the active surface area of the beam.

Although the embodiment of the invention depicted in FIGS. 1, 2 and 3 show the vane 128 located over the upper surface of the disk 102, the vane can also be located proximate the lower surface of the disk. Such a position for the latch apparatus does not in any way alter its operation.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A disk drive comprising:
    a) a rotatable disk capable of storing data, the disk having a planar surface;
    b) an actuator assembly for positioning a transducer assembly for accessing data on the disk;
    c) a housing containing the disk and actuator assembly;
    d) an elongated, thin, flat, flexible vane member having a first end and an opposed second end, and a latch portion proximate the second end disposed in proximity over the surface of the rotatable disk, wherein the latch portion defines a first part of a two-part latch mechanism;
    e) a fastener fixedly attaching the first end of the vane member to the housing;
    f) a second part of the two-part latch mechanism attached to the actuator assembly, and positioned thereupon to engage the first part when the transducer assembly attains a predetermined position relative to the disk; and g) a drive for rotating the disk thereby generating a deflection force relative to the latch portion of the vane member in accordance with a Bernoulli effect for deflecting the vane member toward the surface of the rotating disk along a direction substantially parallel with an axis of rotation of the disk, the first part and the second part of the two-part latch mechanism thereby disengaging to thereby unlatch the actuator assembly.

2. The disk drive of claim 1 wherein the first part of the two-part latch mechanism comprises a latch aperture defined in the latch portion of the flexible vane member proximate its second end, and the second part of the two-part latch mechanism comprises a pin means extending from a rotating part of the actuator assembly.

3. The disk drive of claim 2 wherein said actuator assembly contains at least one vent aperture located proximate said latch aperture.

4. A disk drive comprising:
(a) a rotatable disk capable of storing data, the disk having a readable surface;
(b) an actuator assembly for positioning a transducer assembly for accessing data on the disk;
(c) an elongated, thin, flat, flexible unitary vane member manifesting shape memory, the vane member having a latch portion disposed in proximity over the surface of the rotatable disk, the latch portion including an aperture, wherein the latch portion defines a first part of a two-part latch mechanism;
(d) a second part of the two-part latch mechanism attached to the actuator assembly and positioned thereupon to engage the first part when the transducer assembly attains a predetermined position relative to the disk, the second part including a pin member; and
(e) a drive for rotating the disk thereby generating a deflection force in accordance with a Bernoulli effect for deflecting the vane member toward the surface of the disk along a direction substantially parallel with an axis of rotation of the disk thereby disengaging the aperture from the pin member.

5. The disk drive of claim 4 wherein said actuator assembly contains at least one aperture located proximate said pin member.

6. The disk drive of claim 4 wherein said vane member is formed of a flexible material.

7. The disk drive of claim 6 wherein said flexible material is a thin polyester film.

8. The disk drive of claim 6 wherein said flexible material is steel.

9. The disk drive of claim 4 wherein said aperture of said vane member engages said pin member when said disk stops rotating and said actuator assembly is positioned to park the transducer assembly in a landing zone on the disk.

10. A method for accessing a disk drive, the disk drive including i) a rotatable data storage disk with a planar surface, ii) an actuator assembly for positioning a transducer head for accessing data on the disk, iii) a housing containing the disk and actuator assembly, iv) an elongated, thin, flat, flexible vane member having a first end and an opposed second end, and a latch portion proximate the second end, the first end of the vane member being fixedly attached to the housing, wherein the latch portion defines a first part of a two-part latch mechanism, v) a second part of the two-part latch mechanism attached to the actuator assembly, and vi) a drive for rotating the disk, the method comprising the steps:

(a) positioning the vane member in proximity over the surface of the data storage disk;
(b) engaging the first and second parts of the two-part latch mechanism together when the transducer assembly attains a predetermined position relative to the disk, thereby latching the actuator assembly; and
(c) rotating the disk thereby generating a deflection force of differential ambient pressures relative to the latch portion of the vane member in accordance with a Bernoulli effect for deflecting the vane member toward the readable surface of the rotating disk along a direction substantially parallel with an axis of rotation of the disk to disengage the first part and the second part of the two-part latch mechanism, thereby unlatching the actuator assembly.

11. The method set forth in claim 10 wherein the step of engaging the first and second parts of the two-part latch mechanism causes the vane member to be in a tension latching position thereby resisting release of the two-part latch mechanism.

12. The method set forth in claim 10 wherein the step of positioning the vane member in proximity over the surface of the data storage disk comprises the step of positioning the air vane member at a radially outermost region of the surface of the data storage disk.

* * * * *